J. T. COWAN.
RESILIENT WHEEL.
APPLICATION FILED SEPT. 20, 1917.
1,290,519.
Patented Jan. 7, 1919.
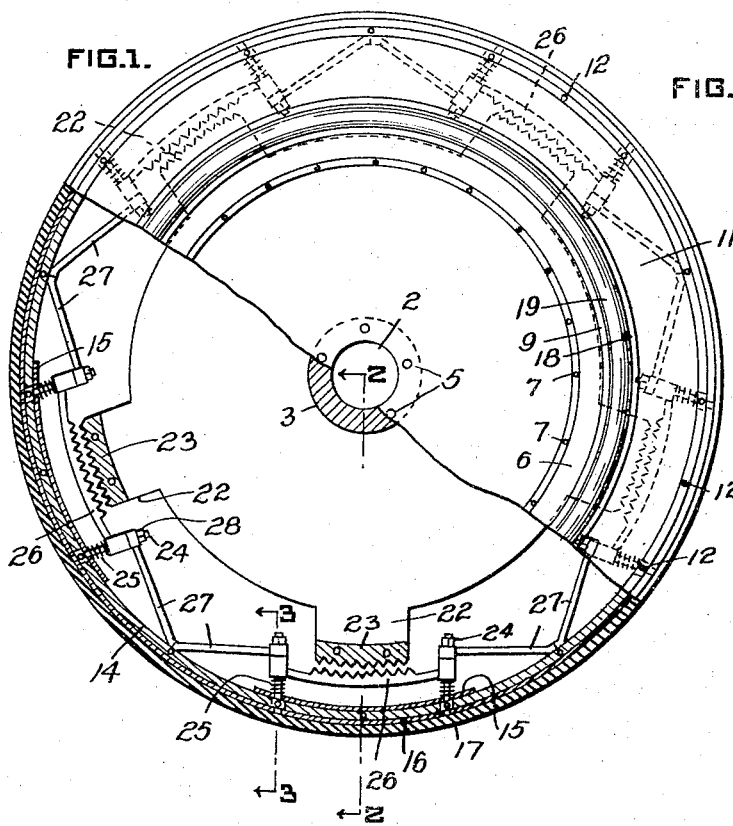
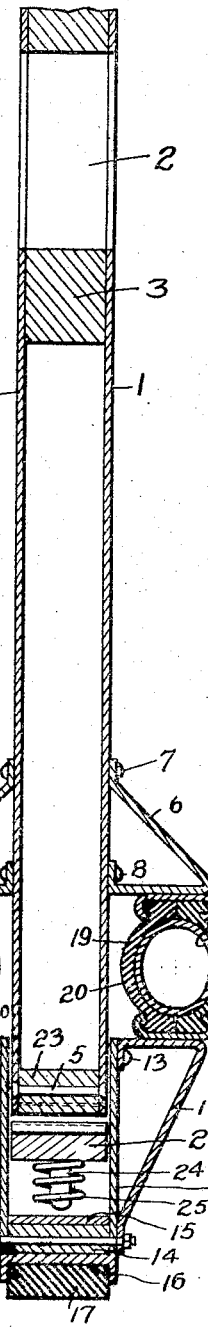
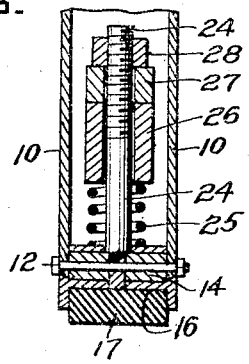
WITNESSES
J. Herbert Bradley.
Jo. Baily Brown.
INVENTOR
John T. Cowan
by Fred W. Winter
his Attorney

UNITED STATES PATENT OFFICE.

JOHN T. COWAN, OF PITTSBURGH, PENNSYLVANIA.

RESILIENT WHEEL.

1,290,519.  Specification of Letters Patent.  Patented Jan. 7, 1919.

Application filed September 20, 1917. Serial No. 192,321.

*To all whom it may concern:*

Be it known that I, JOHN T. COWAN, a resident of Pittsburgh, in the county of Allegheny and State of Pennsylvania, have invented a new and useful Improvement in Resilient Wheels, of which the following is a specification.

This invention relates to resilient vehicle wheels.

The object of this invention is to provide a vehicle wheel comprising as one of its load carrying members an intermediate pneumatic casing. A further object is to so place the pneumatic element of the wheel that it will not be upon the tread thereof; but in an easily accessible position, not exposed to wear against ground surface as are ordinary pneumatic tires. A further object is to furnish means for bracing the parts of the wheel against relative turning strains, and connect the whole device to secure the necessary strength for such structures.

Referring to the drawings, Figure 1, is a side elevation of a wheel constructed according to this invention, with parts thereof broken away to expose the interior; Fig. 2 is an enlarged partial vertical section on the line 2—2 of Fig. 1; and Fig. 3 is an enlarged partial section on the line 3—3 of Fig. 1.

The wheel is made up without spokes. Instead a circular member composed of plates 1 having a central opening 2, to engage a suitable form of bearing or hub, is provided. These plates are bolted together and are spaced apart by a central ring 3, of suitable material, and by an outer ring 4. Bolts 5 rigidly clamp the two plates against the rings. To the outer edges of the plates 1 are attached circular angle iron brackets 6, by bolts 7 and 8. These members are adapted to form supporting bases for rims 9 which are rigidly attached thereto by any suitable means. These rims 9 are adapted to retain rubber casings as below described.

The tread member of the wheel is made up of two annular plates 10, to which are attached supporting brackets 11, similar to brackets 6, but oppositely disposed thereto. These brackets are fastened to plates 10 by bolts 12 and 13. The plates are spaced apart by a wooden felly 14 and metal strips 15, and carry on their outside a rim 16, adapted to hold a solid rubber tire 17, in the usual manner. The upper surface of the brackets 11 carry attached thereto retaining rims 18, similar to the above mentioned rim 9, but oppositely disposed. Between the rims 18 and 9 are carried two resilient members formed of pairs of rubber casings 19 and 20 adapted to inclose and retain air-tight tubes 21, similar to the ordinary inner tube of a pneumatic tire. These tubes are provided with suitable valves of the ordinary kind, not here illustrated.

In order to relieve the strain upon the resilient members 19 and 20, when the wheel is being driven, as on the rear of an automobile, the inner wheel member has a plurality of radial extensions 22 between which are fitted terminal members 23, having a series of teeth on the outer surface thereof. Between the plates 10, above described, and attached to the strips 15 and felly 14, are sets of parallel posts 24 threaded at their free ends. Coil springs 25 surround these posts, and support cross members 26, which are slidably mounted at each end on the posts. Braces 27 are provided to secure the rigidity of posts 24, these braces being fastened into the felly 14 at one end, engaging posts 24 at the other, and held in place by terminal nuts 28. This leaves cross member 26 free to be pressed downward against spring pressure toward the rim of the wheel, while the springs normally retain it in position as shown in Fig. 1. The upper side of the bar member 26 has a series of teeth adapted to engage the teeth of member 23, above stated. Both sets of teeth are preferably lined with some cushioning material, as tough rubber.

In operation the function of the various parts is as follows:

Any suitable hub or bearing is fitted into the central opening 2, and incloses the vehicle axle. The tubes 21 are inflated to the desired pressure, depending upon the size and weight of vehicle carried. These tubes normally support the load of the wheel and furnish a resilient element, corresponding to the ordinary pneumatic tire on vehicle wheels. These pneumatic members are used in pairs, one on each side of the wheel where they are readily reached for repair or any other desired purposes. An additional resilient element is provided in the form of a solid rubber tire 17. Thus the load is carried by the pneumatic members between the rims 9 and 18, but these members are not exposed to puncture and wear by contact with road surface, and therefore, last much longer than tires and may be constructed at less expense.

The extensions 22 and their terminal teeth, will engage the teeth of the cross bar 26, and therefore, prevent any rotation of the inner member without similar rotation of the outer member. As the wheel turns, and the load passes to another portion of the tread, the teeth which have been engaged will be disengaged and a new set will grip. That is, only the set of teeth will be in engagement which is toward the ground, the other sets being free as the load passes.

I claim:

1. A vehicle wheel comprising a circular member adapted to be carried on an axle, circular supports at the outside of the said member, two pairs of resilient casings attached to said supports, pneumatic tubes in the casings, an outer concentric tread member having circular brackets thereon engaging the pairs of casing members, and means to prevent the relative rotation of the inner circular member and the outer tread member, said means comprising toothed projections on the inner circular member and resiliently supported coöperating toothed members on the outer circular member.

2. A vehicle wheel comprising an inner circular member adapted to be mounted on an axle, an outer circular member adapted to form the wheel tread, connections between the inner and outer circular members comprising two pairs of resilient casings each pair containing a pneumatic tube, and means to prevent the relative rotation of the inner and outer members, said means comprising toothed members adapted to engage just above the contact of the wheel with the ground, one of said toothed members being attached to the inner circular member and the other being mounted upon springs and attached to the outer circular member.

In testimony whereof, I have hereunto set my hand.

JOHN T. COWAN.

Witness:
GLENN H. LERESCHE.

Copies of this patent may be obtained for five cents each, by addressing the "Commissioner of Patents, Washington, D. C."